(12) United States Patent
Kishida et al.

(10) Patent No.: US 7,257,703 B2
(45) Date of Patent: Aug. 14, 2007

(54) BOOTABLE NAND FLASH MEMORY ARCHITECTURE

(75) Inventors: Junichi Kishida, Tokyo (JP); Douglas N. Wong, Trabuco Canyon, CA (US); Atsushi Inoue, Kawasaki (JP)

(73) Assignee: Toshiba America Electronic Components, Inc., Irvine, CA (US)

( * ) Notice: Subject to any disclaimer, the term of this patent is extended or adjusted under 35 U.S.C. 154(b) by 297 days.

(21) Appl. No.: 10/716,159

(22) Filed: Nov. 18, 2003

(65) Prior Publication Data

US 2005/0108500 A1    May 19, 2005

(51) Int. Cl.
*G11C 16/00* (2006.01)
(52) U.S. Cl. .......................................... 713/2; 711/102
(58) Field of Classification Search ...................... None
See application file for complete search history.

(56) References Cited

U.S. PATENT DOCUMENTS

| | | | |
|---|---|---|---|
| 5,197,034 A | 3/1993 | Fandrich et al. | |
| 5,402,383 A | 3/1995 | Akaogi | |
| 5,448,045 A * | 9/1995 | Clark | 235/382 |
| 5,473,775 A | 12/1995 | Sakai et al. | |
| 5,502,835 A | 3/1996 | Le et al. | |
| 5,522,026 A | 5/1996 | Records et al. | |
| 5,535,357 A | 7/1996 | Moran et al. | |
| 5,794,054 A * | 8/1998 | Le et al. | 710/240 |
| 6,058,048 A | 5/2000 | Kwon | |
| 6,263,399 B1 | 7/2001 | Hwang | |
| 6,377,486 B1 | 4/2002 | Lee | |
| 6,400,611 B1 | 6/2002 | Franklin et al. | |
| 2003/0172261 A1* | 9/2003 | Lee et al. | 713/1 |
| 2003/0172661 A1 | 9/2003 | Lee et al. | |
| 2004/0017708 A1* | 1/2004 | Choi et al. | 365/200 |
| 2004/0076069 A1* | 4/2004 | Voth et al. | 365/232 |
| 2004/0136259 A1* | 7/2004 | Klint | 365/232 |
| 2004/0213066 A1* | 10/2004 | Imamiya | 365/222 |
| 2004/0257874 A1* | 12/2004 | Tanaka et al. | 365/185.09 |
| 2005/0080987 A1* | 4/2005 | Zitlaw | 711/104 |

* cited by examiner

*Primary Examiner*—B. James Peikari
(74) *Attorney, Agent, or Firm*—Tucker, Ellis, & West LLP (57) ABSTRACT

A memory architecture allows for use of non-addressable NAND memory to be used as boot memory in digital processing systems. NAND memory, which is typically of lower cost and higher density, may displace all memory in processor systems, as particularly useful in low-power processor implementations. During commencement of a boot sequence, a preselected address is provided to a NAND flash memory. This preselected address coincides with that expected by a processor unit during commencement of a boot sequence. Upon completion of a selected duration, the NAND flash increments to a next, sequential memory location and thus outputs a sequence of instructions on its data lines. The data lines of the NAND flash memory are provided as input data lines to a processor unit. The processor unit, during a boot sequence, fetches subsequent boot instructions at a timing that coincides with that which is output from the NAND flash memory.

21 Claims, 5 Drawing Sheets

BOOTABLE NAND FLASH MEMORY ARCHITECTURE

BACKGROUND OF THE INVENTION

The subject invention is directed broadly to memory architectures, and more particularly to memory architectures in high-density or low-power applications, and will be described with particular reference thereto. It will be appreciated by one of ordinary skill in the art that the subject architecture is useful in any fetch-instruction processor application in which lower cost or higher density is advantageous.

Typical processor architectures employ a central processing unit ("CPU") working in conjunction with both addressable and non-addressable memory. A typical, addressable memory includes two sets of lines to access specified memory locations. Address lines allow for input of a binary number that corresponds to a memory location. In an addressable memory, a particular memory location is specified by placing a binary address as a digital input on the address lines. At this point, access by the data lines is made to the specified memory location. A read-write enable ("RW") input is typically used to signify whether data from the data lines is to be stored into the selected memory location, or read from the selected memory location. Since any address may be placed on the address lines at any given time, access is truly random in nature. Thus, an addressable memory devices is referred to as random access memory, or RAM. A non-addressable memory by comparison does not use address lines to select a particular memory location. Instead, data is written into the memory or read from the memory as a serial stream of information. An early tape drive for storage of data would be one example of a non-addressable memory device.

Low-power or compact CPUs are typically formed as microprocessor units ("MPU"). Data, which is stored in the memory, is communicated in parallel by a plurality of data lines. MPU is used herein insofar as a microprocessor unit as envisioned in the preferred embodiments. However, it will be appreciated by one of ordinary skill in the art that the subject architecture is applicable to any digital CPU/memory architecture.

During typical processor operation, a CPU provides an address in the memory device from which a particular data item or instruction is desired. The memory device retrieves the data or instruction from the selected location via the address lines, and provides that data or instruction on the data lines. Thus, the MPU is able to fetch the desired data or instruction from the device. Such an addressable memory architecture works in a random fashion, leading to its designation as random access memory RAM, as noted above.

Other conventional memory devices are not random access in nature. Such data devices may require serial access of data, such as from a tape drive, hard disk, serial data stream or the like. Given the serial nature of such data streams, it is difficult to use a sequential memory device for fetching and processing instructions or data.

Most digital processing systems are prepared to become active from an off or powered-down state. When powering up, a digital device has extremely limited capability, and must at least load a core or kernel of instructions to allow the device to engraft upon the system the functionality necessary to accomplish most conventional, computerized tasks. This is generally accomplished by having a forced memory location from which a processor will commence operation during a power-up sequence. This memory location has a set of instructions which provides the basic functionality necessary for the system. Once this initial application has been loaded and run, the system has enough intelligence to allow it to accomplish more refined tasks, such as addressing peripheral equipment, loading an operating system or commencing operation of other, selected programs.

The operation of a typical boot sequence, as noted above, requires a presence of at least a small core of RAM to allow for sequential addressing of a boot code. Random access memory is relatively expensive and requires a relatively large amount of space to fabricate when compared to serial memory devices. Such a serial memory device, e.g., NAND flash memory, is still used in hybrid RAM/NAND architecture. It would be desirable if a boot sequence could be completed from NAND memory, thus eliminating the requirement of RAM memory with its associated drawbacks.

The subject invention provides a bootable CPU that is able to use code disposed in NAND flash memory. Thus, power applications such as personal digital assistance ("PDA"), cellular phones or other compact and energy efficient electronic devices may utilize NAND flash memory with its associated benefits.

An advantage of the present invention is the provision of a processing system which utilizes less power than those employing RAM memory.

Another advantage of the present invention is the provision of a processor system that is more compact.

Yet another advantage of the present invention is the provision of compact and cooler-memory which allows for selective inclusion on the same chip substrate of that of a processing device.

These and further advantages will become apparent to others upon reading and understanding the subject disclosure.

BRIEF SUMMARY OF THE INVENTION

In accordance with the present invention, there is provided a non-addressable memory for outputting a code sequence which includes a series of data storage locations. A set of data lines is adapted to output data stored in the data locations. A device includes an internal address register which stores an address associated with a memory location from which data is output on the output lines. A boot sequence is commenced by placing a preselected address into this register upon receipt of a run signal. This run signal is representative of the commencement of a preselected code sequence, e.g., the boot sequence. A counter is provided for selectively incrementing the internal address register such that a series of instructions may be output on the data lines. When this sequence of instructions correlates to timing of instructions as expected by an associated CPU, the CPU can commence operation of a sequence, such as a boot sequence, without the use of a memory inclusive of address lines.

In accordance with another aspect of the present invention, a mechanism is provided for synchronizing the CPU instruction fetch with an output of a next instruction from the sequence of data storage locations.

In accordance with the further aspect of the present invention, the loading of the preselected address into the material address register is commenced with a power-on signal associated with a boot of a data processing device.

BRIEF SUMMARY OF THE DRAWINGS

Turning now to the drawing wherein the depictions are for the purpose of illustrating the preferred embodiment of the invention, and not for the purpose of limiting the same.

DETAILED DESCRIPTION OF THE PREFERRED EMBODIMENT

Figure 1:
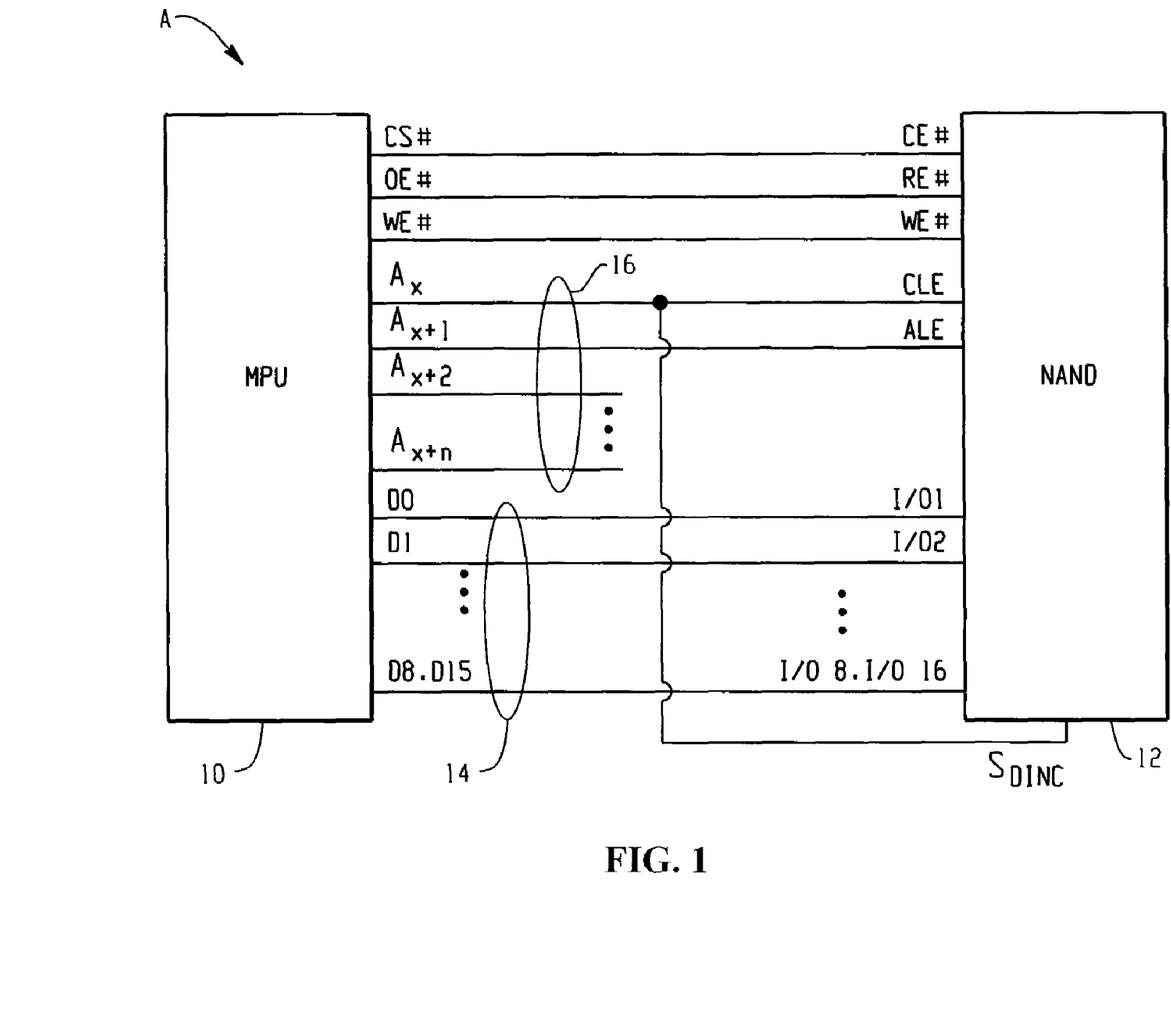
FIG. 1 illustrates a physical connection between a microprocessor unit and the non-addressable memory as taught by the subject invention.

Turning now to the drawings, FIG. 1 illustrates the overall architecture of the embodiment of the subject invention. A processor device A includes a CPU which, in this embodiment, is comprised of the MPU 10. In the preferred embodiment, an MPU is comprised of a sequential processor consisting of a reduced instruction set computer, or RISC device. As will be appreciated by one of ordinary skill in the art, a RISC processor operates with a smaller instruction set than that employed by a complex instruction set computer ("CISC"). Virtually every logical operations of a CISC processor is realizable by a RISC processor operating with a greater number of discrete operations. Given the reduced hardware required by the reduced instruction set, a RISC processor operates more quickly, usually far in excess of 500 MHz. Relative high frequency of a RISC device requires a fast, sequentially accessible memory to provide to it a rapid stream of instructions. Absent such a rapid stream, wait states must be injected into the MPU to allow for a valid, next instruction to be present before execution thereof.

The MPU 10 is in data communication with a non-addressable memory device, suitably comprised of a NAND memory 12. A NAND flash memory, named after the negated-AND gate that forms a fundamental component of the logic of its construction, is a relatively low cost, high capacity, non-volatile memory device ("NVM"). A NAND flash memory is typically greater than one Gigabit of storage capacity. Give that a NAND flash memory is non-addressable, it is typically thought of for use as data only storage device. An alternative memory structure, known as NOR flash is named from its use of a negated OR gate forming its fundamental component, is traditionally thought of as an addressable memory device for use in instruction storage applications, or hybrid instruction and data storage applications, due to its random access storage capabilities.

In view of the forgoing, many systems employed NOR flash devices to store exectuable code, such as boot code, and NAND flash for data storage, particularly bulk data storage, such as may be needed to store data files, such as spreadsheet information, word processing files, database files, as well as multimedia files, such as image files, audio files, video files, and the like. By way of example, such systems include: personal digital assistants ("PDAs"); cellular telephones, particularly multimedia phones; set-top boxes; digital cameras; and digital recorders, as well as any analogous digital device.

The subject invention allows for a NAND memory device to accommodate both the storage of data, as well as instructions. The subject system thus allows for a single memory device to be used in applications as is noted above. This is particularly advantageous given that such applications may only require an extremely limited amount of code memory, especially in relatively small boot code requirements, while many manufactures no longer fabricate low capacity NOR flash. This further results in a waste of space and expense for unused NOR flash memory capacity.

A plurality of data lines 14 provide for interchange of data between NAND memory 12 and MPU 10. In the illustrated embodiment, sixteen (16) data lines are provided D0–D15, which allows for transmission of a byte or word of sixteen (16) bits, in parallel. It will be appreciated by the illustration of FIG. 1, the non-addressable memory device, as illustrated with the NAND flash device, does not have any dedicated address lines 16 for direct connection to the MPU 10. In such an architecture, there is no mechanism in a conventional sense to allow for a NAND memory 12 to indicate to the MPU 10 that it has a relatively long access latency. In a typical, conventional NAND flash memory, such latency may be around 25 microseconds.

In accordance with the subject invention, the memory device such as NAND memory 12 is provided with a sequence mode in addition to normal operation mode. This sequence mode facilitates output of sequential memory data to the system when the host system, such as MPU 10, requests data by asserting address on its output enable pin OE#, or a similar pin such as read enable pin RE#. Thus, a memory device such as NAND 12 may commence a selected code sequence output upon receipt of a commencement signal.

The sequence noted above is suitably activated by a dedicated chip enable to signal CE# which is suitably assertive on a memory device or power-on reset detection circuitry by a reset pin, such as that illustrated by CS#. Such signals suitably generates an internal signal within the memory device 12 to enable the afore-described sequence mode. As will be apparent from a review of FIG. 1, the address lines 16 are not used in a conventional sense as would be with an addressing scheme in a random access memory device.

Figure 2:
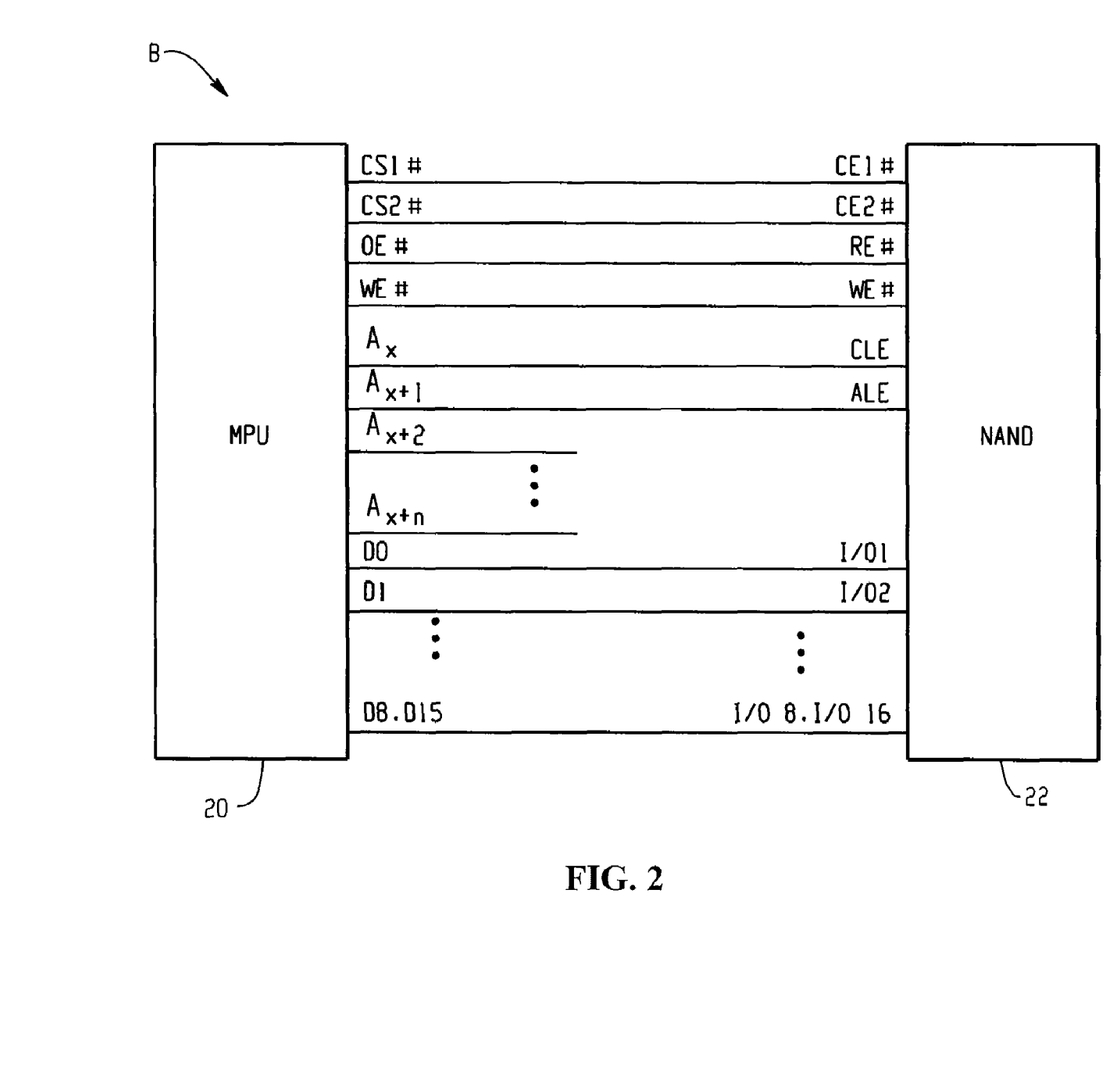
FIG. 2 illustrates an embodiment as with FIG. 1, but inclusive of a second chip enable line to allow for communication between the MPU and serial memory device.

Turning now FIG. 2, a variation of the architecture described in FIG. 1 is provided. In FIG. 2, a processing device B includes a central processor unit, such as MPU 20, in data communication with a non-addressable memory, such as NAND memory 22. In a particular embodiment of FIG. 2, the memory 22 includes first and second chip enable input CE1# and CE2#. These lines correspond to outputs from the processor 20 formed of first and second chips select lines, CS# and CSn#, respectively. An output enable OE# from the MPU 20 forms a read enable RE# into memory 22. In this embodiment in which a second chip enable signal line is provided, a mechanism is provided when a microprocessor may start an initial boot up and the memory device 22 is suitably set to a sequence mode, as described above in connection with FIG. 1, by assertion of CE2#, and then returned to a normal mode of operation by a negation of a signal on CE2#. When the memory device is provided with power-on or reset detection circuitry, it will be appreciated by one of ordinary skill in the art, after a power-on CE# of the memory device is ignored and the memory device is activated to operate in the afore-noted sequence mode without regard to the CE# input. In such an operation, a sequence to return the memory device to normal mode is necessary. A suitable method accomplishing this is to send a command to the memory device to terminate the sequence mode, as illustrated in FIG. 2.

Figure 3:
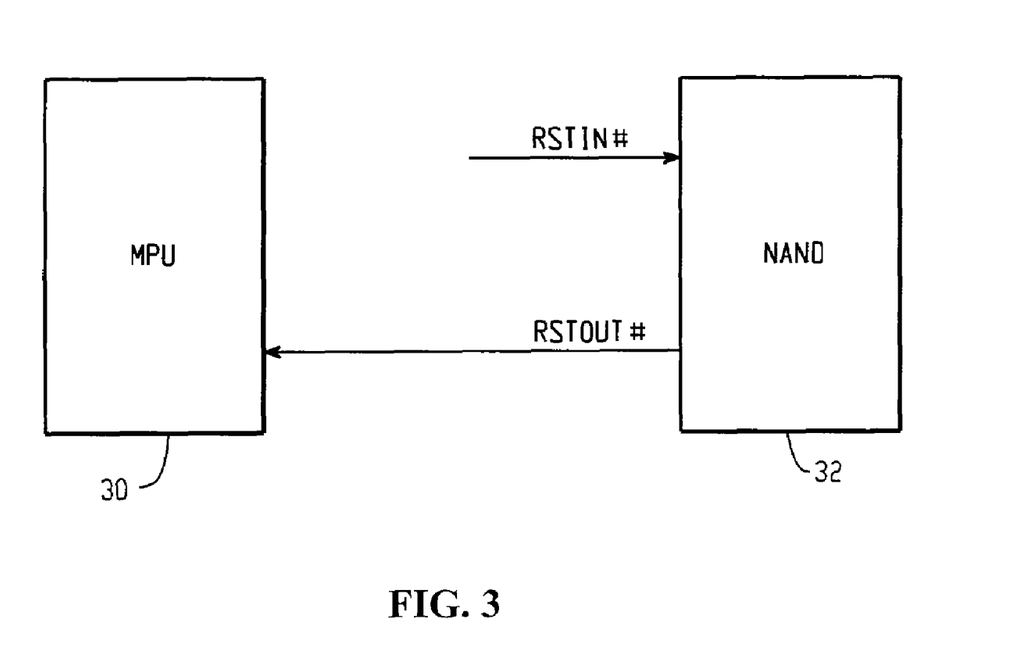
FIG. 3 illustrates additional signal lines disposed between essential processor unit and a serial memory device.

Turning now to FIG. 3, an alternative embodiment for commencing a sequence mode is illustrated. As provided in FIG. 3, an MPU 30 and non-addressable memory 32, such as NAND flash memory, are illustrated. It will be appreciated that the additional interconnections, such as that provided by data lines, have been omitted from FIG. 3 for ease and illustration. In the embodiment of FIG. 3, a reset input into memory 32 is illustrated by RSTIN#. A reset output from memory 32 into processor 30 is illustrated by RSTOUT#. Such additional communication between the processor and memory device allows for an alternative action of a sequence mode, such as a boot sequence. This may be accomplished by providing a commencement of a boot signal by placement of the RSTIN# signal, the commencement of which generates the RSTOUT# signal into processor 30. Thus, the reset signal commences the operation, such as the boot sequence operation, and is synchronized with operation of the processor 30.

In accordance with the foregoing, it will be appreciated that an output signal from a memory device is suitably used to indicate that the device is busy and may be used to prevent an associated processor from timing out. By way of example, a microprocessor is suitably kept in reset mode until boot strap code is ready in the associated memory device. For situations, such as a soft reset, suitable commands are provided to a NAND flash to address situations in which a re-boot may be necessary without power cycling.

Figure 4:
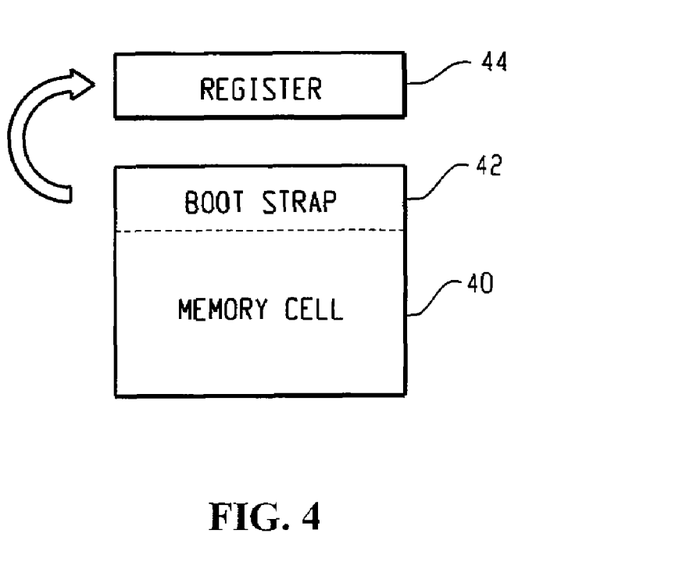
FIG. 4 illustrates a load sequence to provide for initial register loading within a serial memory device as provided at boot time.

The sequence mode noted above includes two functions. A first function is to enable serial data output from a memory device. This is suitably accomplished by toggling the output enable OE#, or a similar signal, such as the read enable RE#, of an associated microprocessor. In the preferred embodiment, the data represents sequential microprocessor instructions and thus no address pins are required. When a sequence is enabled, the memory device in the preferred embodiment automatically loads its internal register from an associated memory cell area which holds initial boot strap code as is illustrated in FIG. 4. As illustrated therein, a memory cell 40 includes a boot strap program area 42 which is selectively placed in data communication with a register 44. A memory cell area 40 is suitably a primary memory cell or alternatively isolated from a primary cell memory area, such as a redundant memory cell array. The register area 44 provides for addressing within the memory cell 40. It is to be appreciated that even the designated internal register 44 may be used to store data. When used in a boot sequence, a boot strap code size may vary from one page length, in the case of NAND flash memory to more than one page length by use of sequential read functions, or other analogous functions such as gapless sequential read functions typically provided with NAND flash memory devices as will be appreciated by one of ordinary skill in the art. It will therefore be appreciated that an initial boot strap sequence can be any suitable length as may be required for a particular application.

It will also be appreciated that the memory device may be provided with other adjuncts as is typically provided, such as error correction code, parity bits, as well as any ward length which may be desirable for a particular application.

In connection with the foregoing, it will be appreciated that a selected sequence, such as a boot program, is advantageously written without any jump instructions insofar as there is no mechanism to communicate address output from a microprocessor. The system functions to output data sequentially, assuming that a sequence or a boot program execution address does not jump out of sequential order. Practically, this is not a problem, insofar as one purpose of a program, such as a boot program, is to set internal registers of microprocessor and/or associated system. In typical operation, such actions do not require any loop, jump or conditional jump instructions.

Figure 5:
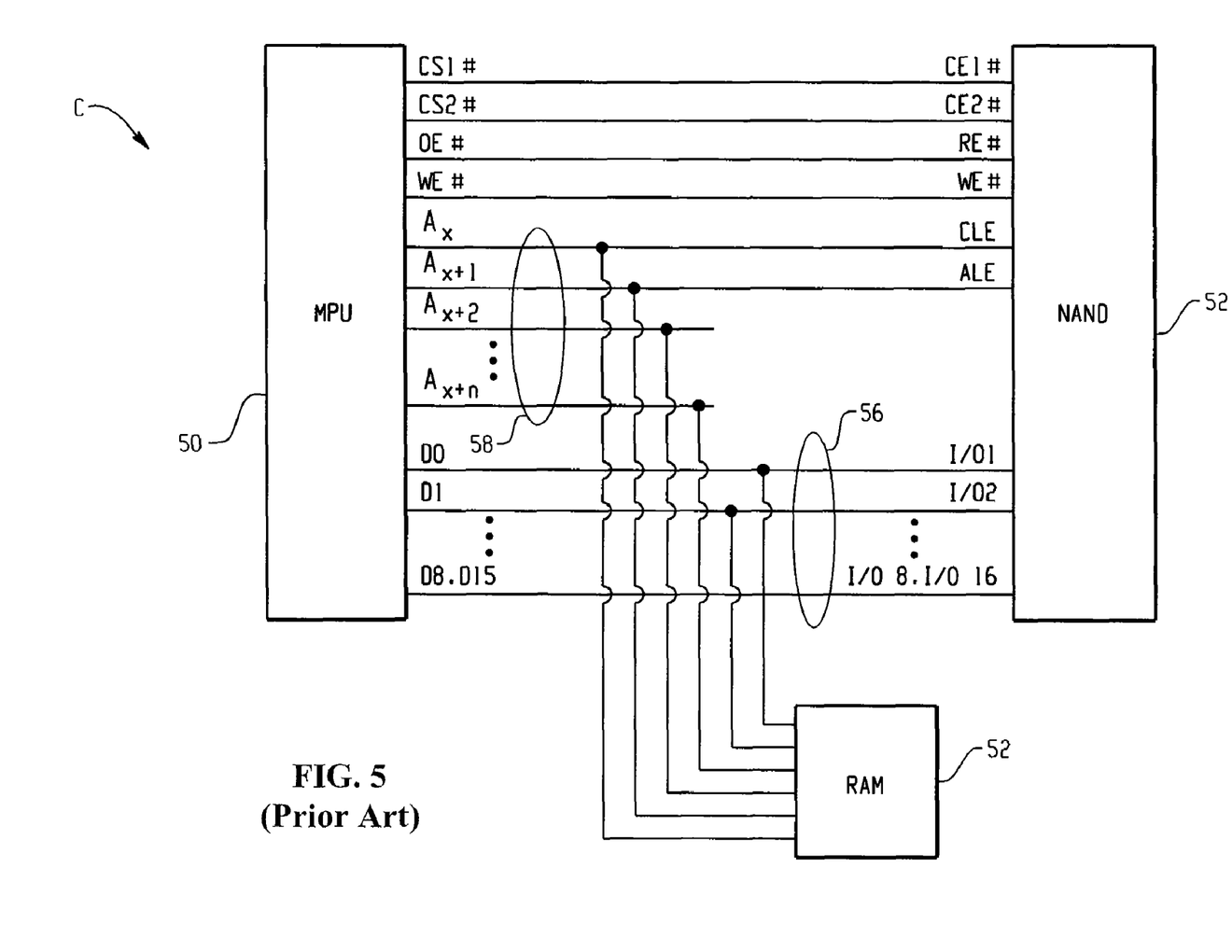
FIG. 5 illustrates an embodiment with a RAM associated with the flash NAND device.

In accordance with the subject system, in the event that code sequence are forced to utilize loops, jumps, conditional jumps, or the like, a boot program may suitably copy itself into associated RAM 54 as illustrated in FIG. 5. Such a copy function is provided itself from sequentially executing instructions. After completion of such a copying operation, the boot program may transfer execution to that portion of the program which has been copied into an associated RAM. As illustrated in FIG. 5. MPU 50 is coupled to NAND 52. The boot program is copied on I/O lines 56 from NAND 52 to RAM 54. RAM 54 is addressable by MPU 50 using address lines 58.

Figure 6:
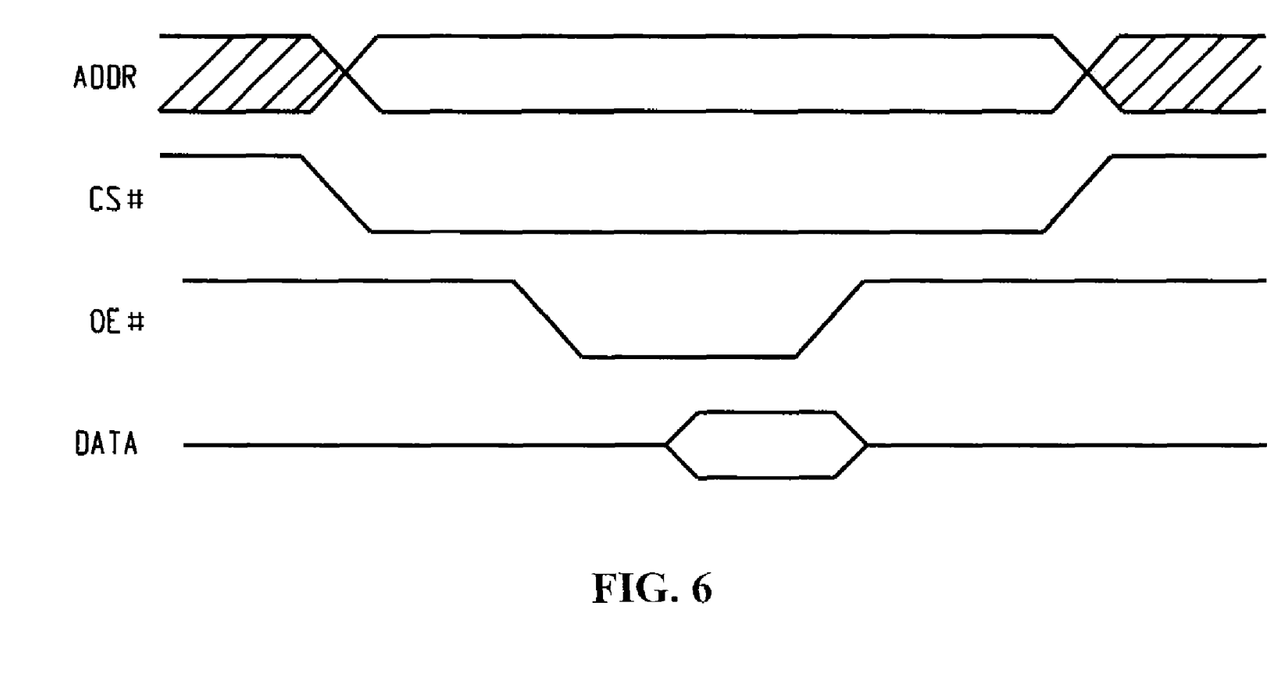
FIG. 6 illustrates a representative timing diagram for address and communication lines provided between the central process unit and serial, memory device.

Turning now to FIG. 6, a suitable timing diagram for address lines, chips lines, output enable lines and data lines, as illustrated in the foregoing figures, is described. With the relative timing as illustrated in FIG. 6, it would be appreciated that memory such as NAND flash devices which do not possess address pins may be directly tied to a processor bus which has typical bus timing as illustrated by the figure. Thus, the system provides for use of boot memory without address pins and is particularly advantageous for allowing for a boot sequence to be completed from a NAND memory device.

By virtue of the foregoing, a mechanism is provided for allowing for power-up, reset or other specialized instruction sequences to be accomplished directly from a serially or sequentially outputting memory, such as a NAND flash memory, as well as any other memory that does not provide for direct addressing via address lines. Thus, devices are fabricated which may be lower cost, smaller dimension, generate less heat, and be less expensive to operate than have been provided heretofore.

What is claimed is:

1. An externally non-addressable memory for outputting an executable code sequence comprising:
a plurality of data storage locations;
a plurality data lines adapted for outputting data stored in the plurality of data storage locations;
an internal address register adapted for storing address information associated with a memory location associated with an instruction to be output on the data lines;
means for switching to a sequential mode responsive to an external run signal being asserted;
means for loading a preselected address into the internal address register responsive to the means for entering a sequential mode;
counter means for sequentially incrementing the internal address register so that instructions of the code sequence sequentially appear on the data lines until completion thereof so as to be synchronous with an instruction fetch sequence of an associated processor; and
means for switching to a normal mode responsive to the external signal being negated.

2. The memory of claim 1 further comprising means for receiving an externally generated clock signal, wherein the counter means is incremented in accordance with the externally generated clock signal.

3. The memory of claim 2 further comprising means adapted for receiving the run signal from an associated data device.

4. The memory of claim 2 further comprising means for generating the run signal in accordance with a power on state of a data processing device into which the memory is incorporated.

5. The memory of claim 1 further comprising means for generating a wait signal corresponding to a duration in which no valid data is available on the data lines.

6. The memory of claim 1 further comprising an associated, addressable, random access memory into which the code sequence is copied.

7. The memory of claim 2 further comprising an associated processor device, which processor device is synchronized so as to operate on instructions the code sequence as it is output onto the data lines.

8. A bootable NAND flash memory comprising:
a plurality of instruction storage locations;
a plurality data lines adapted for outputting instructions stored in the plurality of data storage locations;
an internal address register adapted for storing address information associated with a memory location in which is stored one of a plurality instructions associated with a boot sequence is to be output on the data lines;
means for switching to a sequential mode in accordance with a boot signal representative of a commencement of a boot code sequence;
means for loading a preselected address into the internal address register responsive to the means for switching to a sequential mode;
counter means for sequentially incrementing the internal address register so that instructions of the boot sequence sequentially appear on the data lines until completion thereof so as to be synchronous with an instruction fetch sequence of an associated processor; and
means for switching to a normal operating mode upon de-assertion of the boot signal.

9. The bootable NAND flash memory of claim 8 further comprising a boot signal generator for generating the boot signal upon power up of a data processing device.

10. The bootable NAND flash memory of claim 9 further comprising an addressable, random access memory in data communication with the data lines into which the boot sequence is copied.

11. The bootable NAND flash memory of claim 10 wherein the boot signal generator is comprised of a central processor unit.

12. The bootable NAND flash memory of claim 11 further comprising a means for generating a busy signal representative of a duration in which valid boot data is not available on the data lines.

13. A method of running programs disposed in a non-externally addressable memory comprising the steps of:
receiving a run signal representative of a commencement of a preselected code sequence disposed in the non-externally addressable memory;
upon receipt of the run signal, switching to a sequential mode of operation and preloading an internal address register with a preselected address corresponding with a first instruction of the code sequence;
outputting an instruction associated with the address of the internal address register;
incrementing the internal address register so as to output each instruction forming the preselected code sequence synchronously with an instruction fetch sequence of an associated processor; and
switching to a normal mode of operation after each instruction forming the preselected code sequence has been output.

14. The method of claim 13 further comprising the step of synchronizing the incrementing of the internal address register to correspond with instructions receivable into an associated, central processor unit.

15. The method of claim 13 further comprising the step of copying the preselected code sequence into an associated, addressable random access memory.

16. The method of claim 15 further comprising the step of generating the run signal in accordance with at least one of power up and a reset of a data processing device.

17. The method of claim 16 further comprising the step of transferring instructions from a secondary memory device upon completion of the code sequence.

18. An externally non-addressable memory for outputting an executable code sequence comprising:
a plurality of data storage locations;
a plurality data lines adapted for outputting data stored in the plurality of data storage locations;
an internal address register storing address information associated with a memory location associated with an instruction to be output on the data lines, the internal address register receiving a preselected address upon receipt of a run signal representative of a commencement of a preselected code sequence comprised of a plurality of executable instructions stored in the plurality of data storage locations signal;
a counter to sequentially increment a content of the internal address register in response to a clock signal so that instructions of the code sequence sequentially appear on the data lines in series responsive to the run instruction synchronously with an instruction fetch sequence of an associated processor; and
means for switching to a normal mode of operation after the code sequence has been output.

19. The memory of claim 18 wherein the plurality of data storage locations include nonvolatile memory cells.

20. The memory of claim 19 wherein the run signal is generated in response to a power on state of an data processing device into which the memory is incorporated.

21. The memory of claim 18 wherein the memory receives a wait signal representing a duration in which no valid data is available on the data lines.

* * * * *

UNITED STATES PATENT AND TRADEMARK OFFICE
CERTIFICATE OF CORRECTION

| | |
|---|---|
| PATENT NO. | : 7,257,703 B2 |
| APPLICATION NO. | : 10/716159 |
| DATED | : August 14, 2007 |
| INVENTOR(S) | : Junichi Kishida, Douglas N. Wong, and Atsushi Inoue |

It is certified that error appears in the above-identified patent and that said Letters Patent is hereby corrected as shown below:

On the title page item (73), should read Assignee: Toshiba America Electronic Components, Inc., Irvine, California Signed and Sealed this Thirteenth Day of November, 2007

JON W. DUDAS
*Director of the United States Patent and Trademark Office*